United States Patent Office.

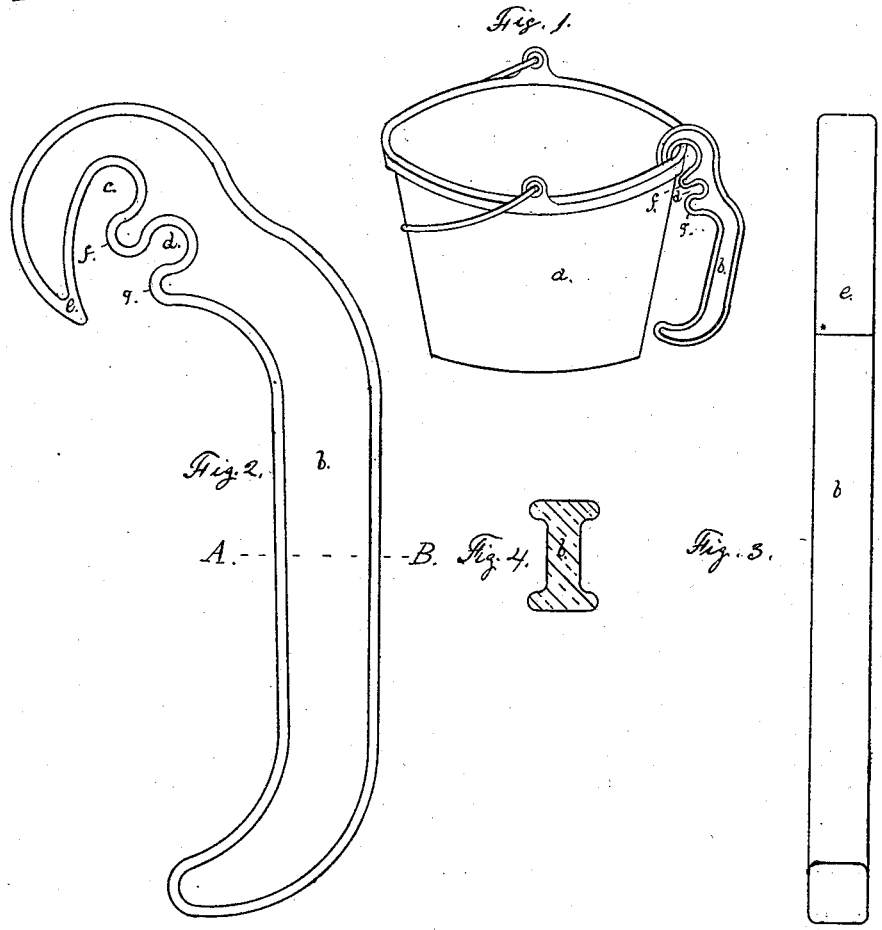

HORACE T. ROBBINS, OF HYDE PARK, MASSACHUSETTS.

Letters Patent No. 114,860, dated May 16, 1871.

IMPROVEMENT IN KETTLE-HANDLES.

*The Schedule referred to in these Letters Patent and making part of the same.*

I, HORACE T. ROBBINS, of Hyde Park, county of Norfolk and State of Massachusetts, have invented an Adjustable Kettle-Handle, of which the following is a specification.

The nature of my invention consists in applying an adjustable side handle to kettles for the purpose of emptying them of their contents (especially when hot) more readily than in the ordinary manner.

Figure 1 is a perspective view of a kettle having my adjustable handle applied to it.

Figure 2 is a side view of the handle on an enlarged scale, and detached from the kettle.

Figure 3 is a view of the same at right angles to fig. 2.

Figure 4 is a section on the line A B.

$a$ is the kettle.

$b$, the handle.

$c$ and $d$, slots in the handle fitting the kettle.

I construct my adjustable kettle-handle substantially as shown in the drawing, of cast-iron or any suitable material, with two slots, $c$ and $d$, the former fitting the top of kettles having a perpendicular edge, and the latter those having a flaring edge.

When applied to a kettle for the purpose of tipping or emptying it, the hook $e$ of the handle grasps the inner and the knob $f$ the outer side of the kettle, if it has a perpendicular edge; but if a flaring edge, the knob $g$ grasps the outer side and firmly holds it as long there is any upward or lifting pressure on the handles, so that the contents may be emptied as readily as from a pitcher; as soon as the lifting pressure is withdrawn the handle may be removed at once.

There may be more slots added to the handle if found desirable, but two are sufficient for all stove-kettles; or the handle may be made with but one slot, the same as this would be if the knob $f$ were removed; this however, would leave the handle too loose when applied to a kettle having a perpendicular edge. Or the slots in the handle may be substituted by a cavity in the side or bottom of a kettle for the handle to fit into; but these are objectionable, as not being so readily adjusted and not at all applicable to kettles now in use.

I claim as my invention—

An adjustable kettle-handle, in combination with a kettle arranged substantially in the manner and for the purpose of emptying a kettle, as specified.

HORACE T. ROBBINS.

Witnesses:
EDWIN A. ALGER,
CHARLES M. CHAMBERLAIN.